(12) United States Patent
Weber et al.

(10) Patent No.: US 8,333,065 B2
(45) Date of Patent: Dec. 18, 2012

(54) SYSTEM FOR DETECTING SULFURIC ACID

(75) Inventors: James Richard Weber, Lacon, IL (US); Thomas Jeffrey Crowell, Metamora, IL (US); Hind Malaeb Abi-Akar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1297 days.

(21) Appl. No.: 12/078,426

(22) Filed: Mar. 31, 2008

(65) Prior Publication Data

US 2009/0241518 A1 Oct. 1, 2009

(51) Int. Cl.
*F01N 3/00* (2006.01)
*F01N 3/02* (2006.01)
*F02M 25/06* (2006.01)
*F02M 25/07* (2006.01)
*F02B 33/44* (2006.01)
*F02B 47/08* (2006.01)

(52) U.S. Cl. ............. 60/297; 60/278; 60/311; 60/605.2; 123/568.11

(58) Field of Classification Search .................... 60/274, 60/278, 297, 311, 605.2; 123/568.11, 568.12; 73/31.03, 31.07; 210/85, 90, 167.01; 422/83, 422/145, 169–171, 177; 423/212, 213.2, 423/320, 522, DIG. 2
See application file for complete search history.

(56) References Cited

U.S. PATENT DOCUMENTS

| | | | |
|---|---|---|---|
| 3,127,255 A * | 3/1964 | Winslow | ......................... 96/178 |
| 3,490,271 A | 5/1967 | Hays | |
| 3,630,216 A | 12/1971 | Kelly | |
| 3,787,650 A | 1/1974 | Lewis | |
| 3,846,795 A | 11/1974 | Jones | |
| 4,337,668 A | 7/1982 | Zupanick | |
| 4,782,891 A * | 11/1988 | Cheadle et al. | ............. 165/134.1 |
| 5,253,674 A | 10/1993 | Argyle et al. | |
| 5,739,755 A | 4/1998 | Goldenberg | |
| 5,740,861 A | 4/1998 | Williams | |
| 6,131,443 A | 10/2000 | Duncan | |
| 6,301,887 B1 * | 10/2001 | Gorel et al. | .................. 60/605.2 |
| 6,487,895 B2 | 12/2002 | Brooker et al. | |
| 6,536,264 B1 | 3/2003 | Flammersfeld et al. | |
| 6,598,388 B2 * | 7/2003 | Lucas et al. | ..................... 60/311 |
| 6,851,414 B2 * | 2/2005 | Gao et al. | .................. 123/568.12 |
| 6,964,694 B2 | 11/2005 | Rauchfuss et al. | |
| 7,111,580 B1 | 9/2006 | Bridges | |
| 7,131,263 B1 * | 11/2006 | Styles | ............................. 60/278 |
| 7,921,639 B2 * | 4/2011 | Silbermann et al. | ............ 60/278 |
| 7,926,272 B2 * | 4/2011 | Takemoto | .................... 60/605.2 |
| 2002/0187083 A1 * | 12/2002 | Bundy | ......................... 422/171 |
| 2003/0226809 A1 * | 12/2003 | Zagone et al. | ................. 210/741 |
| 2004/0103648 A1 * | 6/2004 | Opris et al. | ..................... 60/285 |
| 2006/0042363 A1 | 3/2006 | Howells et al. | |
| 2007/0089399 A1 | 4/2007 | Rhodes et al. | |
| 2007/0267343 A1 * | 11/2007 | Forrester | ....................... 210/600 |

OTHER PUBLICATIONS

"FAQ: The Pressurized Cooling System and Bar's Leaks," Feb. 13, 2003.*

* cited by examiner

*Primary Examiner* — Thomas Denion
*Assistant Examiner* — Audrey K Bradley
(74) *Attorney, Agent, or Firm* — Finnegan, Henderson, Farabow, Garrett & Dunner LLP

(57) ABSTRACT

In one aspect, the present disclosure is directed to a system for reacting with sulfuric acid. The system may include a housing having an inlet and an outlet and may also include a component disposed downstream of the inlet and upstream of the outlet. The component may be configured to restrict a flow of fluid through the housing as a function of sulfuric acid present within the fluid.

23 Claims, 3 Drawing Sheets

SYSTEM FOR DETECTING SULFURIC ACID

TECHNICAL FIELD

The present disclosure relates generally to detection systems and, more particularly, to sulfuric acid detection systems.

BACKGROUND

Exhaust gas recirculation (EGR) systems are used for controlling emissions of undesirable pollutant gases and particulates during operation of an internal combustion engine. Such systems have proven particularly useful in internal combustion engines used in motor vehicles such as passenger cars, trucks, and other on-road machines. EGR systems generally recirculate exhaust gas into an intake air supply of the internal combustion engine. The exhaust gas reintroduced to the engine cylinder reduces the concentration of oxygen in the cylinder, which lowers the maximum combustion temperature, slows the chemical reaction of the combustion process, and decreases the formation of oxides of nitrogen ($NO_x$). Furthermore, the exhaust gas typically contains unburned hydrocarbons which are burned after reintroduction into the engine cylinder further reducing the emission of undesirable pollutants from the internal combustion engine.

Sulfur, that may be present in fuel, may combine with oxygen at certain points in the EGR system to form sulfur trioxide. Relatively hot recirculated exhaust gas is cooled before being reintroduced into the cylinder by directing the exhaust gas through an air-to-gas or a water-to-gas heat exchanger. When the exhaust gas is cooled, water vapor in the exhaust gas may condense and combine with the sulfur trioxide to form sulfuric acid. Sulfuric acid can corrode the surface of the equipment and can lead to maintenance issues.

One system for detecting a corrosive compound in a system is described in U.S. Pat. No. 6,536,264 (the '264 patent), issued to Flammersfeld et al. Specifically, the '264 patent describes a liquid fluid system having a transparent component blocked by a corrodible barrier. Fluid flows through the system in such a way that the corrodible barrier is in contact with the fluid. If the fluid in the system becomes corrosive, the barrier may corrode and allow the fluid to flow into the transparent component. Fluid in the transparent component may then serve as a visual indication that the fluid in the system is corrosive.

While the system of the '264 patent may serve as a visual indication of corrosion in a liquid system, it may not be effective in a gaseous system. A corrosive compound in a liquid system may be in constant contact with the corrodible barrier and may be readily visible in the transparent component. Sulfuric acid in exhaust gas may not contact the corrodible barrier sufficiently to corrode the barrier quickly, and once the barrier corrodes the exhaust gas may not be readily visible in the transparent component.

The present disclosure is directed at overcoming one or more of the shortcomings set forth above or other shortcomings.

SUMMARY

In one aspect, the present disclosure is directed to a system for reacting with sulfuric acid. The system may include a housing having an inlet and an outlet and may also include a component disposed downstream of the inlet and upstream of the outlet. The component may be configured to restrict a flow of fluid through the housing as a function of sulfuric acid present within the fluid.

In another aspect, the present disclosure is directed to a method for altering the flow of fluid in the presence of sulfuric acid. The method may include directing a flow of flow into a housing having an inlet and an outlet and directing the flow into contact with a component disposed downstream of the inlet and upstream of the outlet. The component may be configured to restrict the flow through the housing as a function of sulfuric acid present within the fluid.

DETAILED DESCRIPTION

Figure 1:
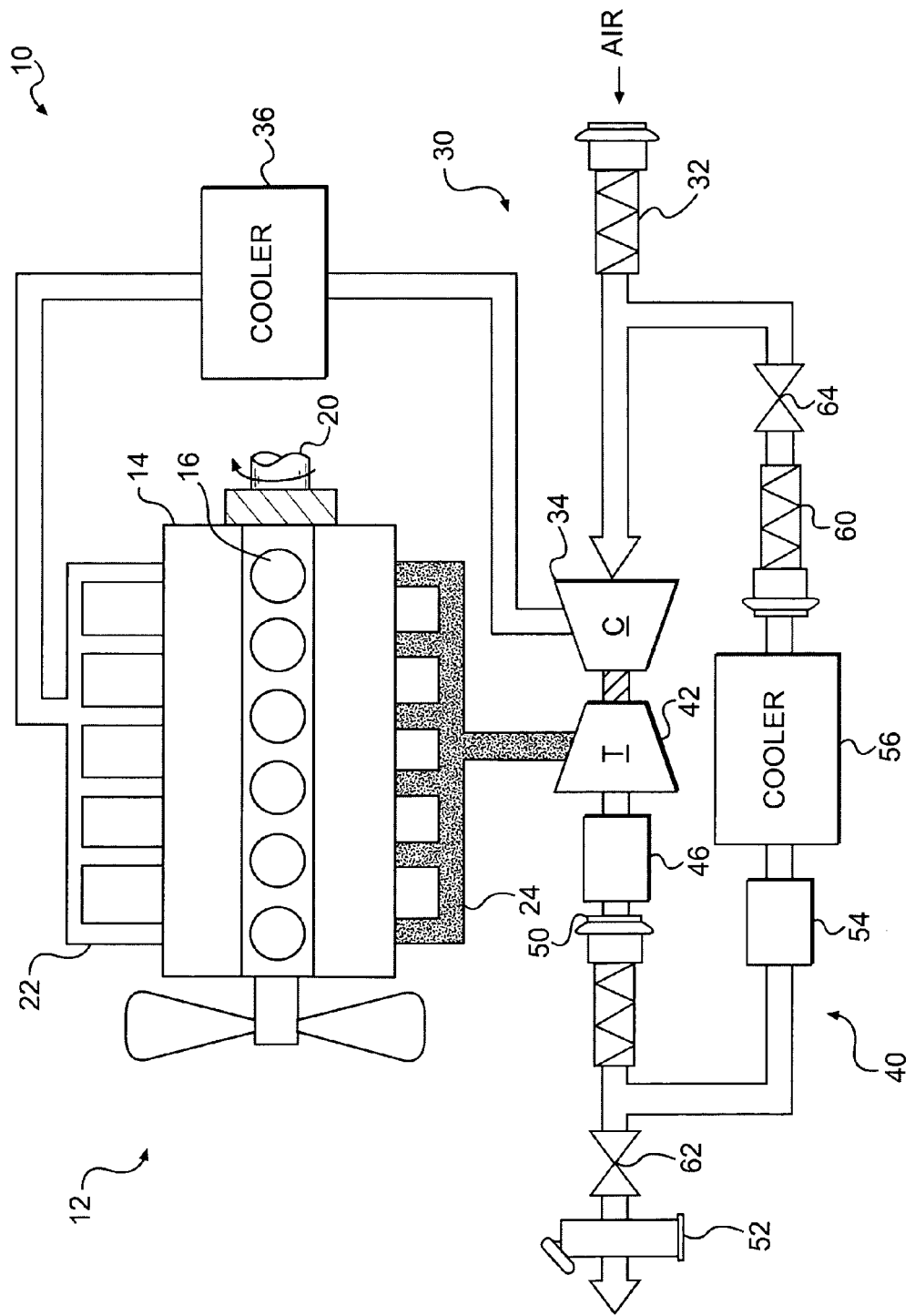
FIG. 1 is a diagrammatic illustration of an exemplary disclosed power system.

FIG. 1 illustrates an exemplary power system 10. Power system 10 is described herein as a diesel-fuel, internal combustion engine 12 for exemplary purposes only. However, it is contemplated that engine 12 may embody any other type of internal combustion engine, such as, for example, a gasoline or gaseous fuel-powered engine. Engine 12 may include an engine block 14 at least partially defining a plurality of cylinders 16. Each cylinder 16 may be associated with a fuel injector, a cylinder liner, at least one air intake port 22 and corresponding intake valve (not shown), at least one exhaust port 24 and corresponding exhaust valve (not shown), a combustion chamber, and a reciprocating piston assembly moveable within each cylinder 16. It is contemplated that engine 12 may include any number of cylinders 16 and that cylinders 16 may be disposed in an "in-line" configuration, a "V" configuration, or any other conventional configuration. A crankshaft 20 of engine 12 may be rotatably disposed within engine block 14.

Power system 10 may be used with a machine. The machine may embody a mobile or stationary machine that performs some type of operation associated with an industry such as mining, construction, farming, transportation, or any other industry known in the art. For example, the machine may be an earth moving machine such as an off-highway haul truck, a wheel loader, a motor grader, a tracked vehicle, or any other suitable earth moving machine. The machine may alternatively embody an on-highway vocational truck, a passenger vehicle, or any other operation-performing machine.

An air induction system 30 may be associated with power system 10 and include components that condition and introduce compressed air into cylinders 16 by way of intake port 22 and the intake valves. For example, air induction system 30 may include an air filter 32, a compressor 34 connected to draw inlet air through air filter 32, and an air cooler 36 located downstream of compressor 34. It is contemplated that air induction system 30 may include different or additional components such as, for example, inlet bypass components, a throttle valve, and other components known in the art.

Air filter 32 may be configured to remove or trap debris from air flowing into power system 10. For example, air filter 32 may include a full-flow filter, a self-cleaning filter, a centrifuge filter, an electro-static precipitator, or any other type of air filtering device known in the art. It is contemplated that more than one air filter 32 may be included within air induction system 30 and disposed in a series or parallel arrangement. Air filter 32 may be connected to inlet port 22.

Compressor 34 may be located downstream of air filter 32 and configured to compress the air flowing into power system 10. Compressor 34 may embody a fixed geometry type compressor, a variable geometry type compressor, or any other type of compressor known in the art. It is contemplated that more than one compressor 34 may be included within air induction system 30 and disposed in parallel or in series relationship. Air cooler 36 may be configured to cool air within air induction system 30 upstream of cylinders 16 and may include a liquid-to-air heat exchanger, an air-to-air heat exchanger, or any other type of heat exchanger known in the art for cooling air.

An exhaust recirculation system 40 may also be associated with power system 10, and include components that condition and direct exhaust from cylinders 16 by way of exhaust ports 24 and the exhaust valves. For example, exhaust recirculation system 40 may include a turbine 42 driven by the exiting exhaust, a regeneration system 46, a particulate filter 50, a flow control valve 62 and an exhaust outlet 52 configured to direct treated exhaust to the atmosphere, a flow meter 54, an exhaust cooler 56, and a filter 60. It is contemplated that exhaust recirculation system 40 may include different or additional components than described above such as, for example, exhaust bypass components, an exhaust braking system, and other components known in the art. As illustrated in FIG. 1, exhaust recirculation system 40 may direct exhaust from downstream of turbine 40 towards intake ports 22. Alternatively, exhaust recirculation system 40 may direct exhaust from upstream of turbine 40 towards intake ports 22.

Turbine 42 may be located to receive exhaust leaving power system 10 via exhaust port 24. Turbine 42 may be connected to compressor 34 of air induction system 30 by way of a common shaft to form a turbocharger. As the hot exhaust gases exiting power system 10 move through turbine 42 and act upon turbine 42, i.e. expand against vanes (not shown) thereof, turbine 42 may rotate and drive the connected compressor 34 to pressurize inlet air. It is contemplated that more than one turbine 42 may be included within exhaust recirculation system 40 and disposed in parallel or in series relationship.

A regeneration system 46 may regenerate the particulate matter. Regeneration system 46 may include, among other things, a fuel-powered burner, an electrically-resistive heater, an engine control strategy, or any other means for regenerating known in the art. Particulate filter 50 may be disposed downstream of turbine 42 to remove particulates from the exhaust flow directed from power system 10. It is contemplated that particulate filter 50 may include electrically conductive or non-conductive coarse mesh elements. It is also contemplated that particulate filter 50 may include a catalyst for reducing an ignition temperature of the particulate matter trapped by particulate filter 50. The catalyst may support the reduction of HC, CO, and/or particulate matter, and may include, for example, a base metal oxide, a molten salt, and/or a precious metal. It is further contemplated that particulate filter 50 may be omitted. It is further contemplated that an additional particulate filter (not shown) may be located within exhaust recirculation system 40.

Exhaust recirculation system 40 may also include mass flow sensor 54 and exhaust cooler 56. Mass flow sensor 54 may be configured to measure exhaust flow. Mass flow sensor 54 may embody, for example, a thermal mass flow meter, a laminar flow element, a mass compensated positive displacement roots meter, or any other suitable device configured to measure gaseous flows. Exhaust cooler 56 may be disposed downstream of particulate filter 50 to cool the portion of exhaust flowing through exhaust recirculation system 40. Exhaust cooler 56 may include a liquid-to-air heat exchanger, an air-to-air heat exchanger, or any other type of heat exchanger known in the art for cooling an exhaust flow. It is contemplated that exhaust cooler 56 may be omitted.

A recirculation valve arrangement 64 may be fluidly connected to exhaust cooler 56 to regulate the flow of exhaust through exhaust recirculation system 40. Recirculation valve arrangement 64 may be configured to selectively pass or restrict the flow of exhaust therethrough. Although illustrated in FIG. 1 as being located downstream of exhaust cooler 56, it is contemplated that recirculation valve arrangement 64 may, alternatively, be located upstream of exhaust cooler 56.

Figure 2:
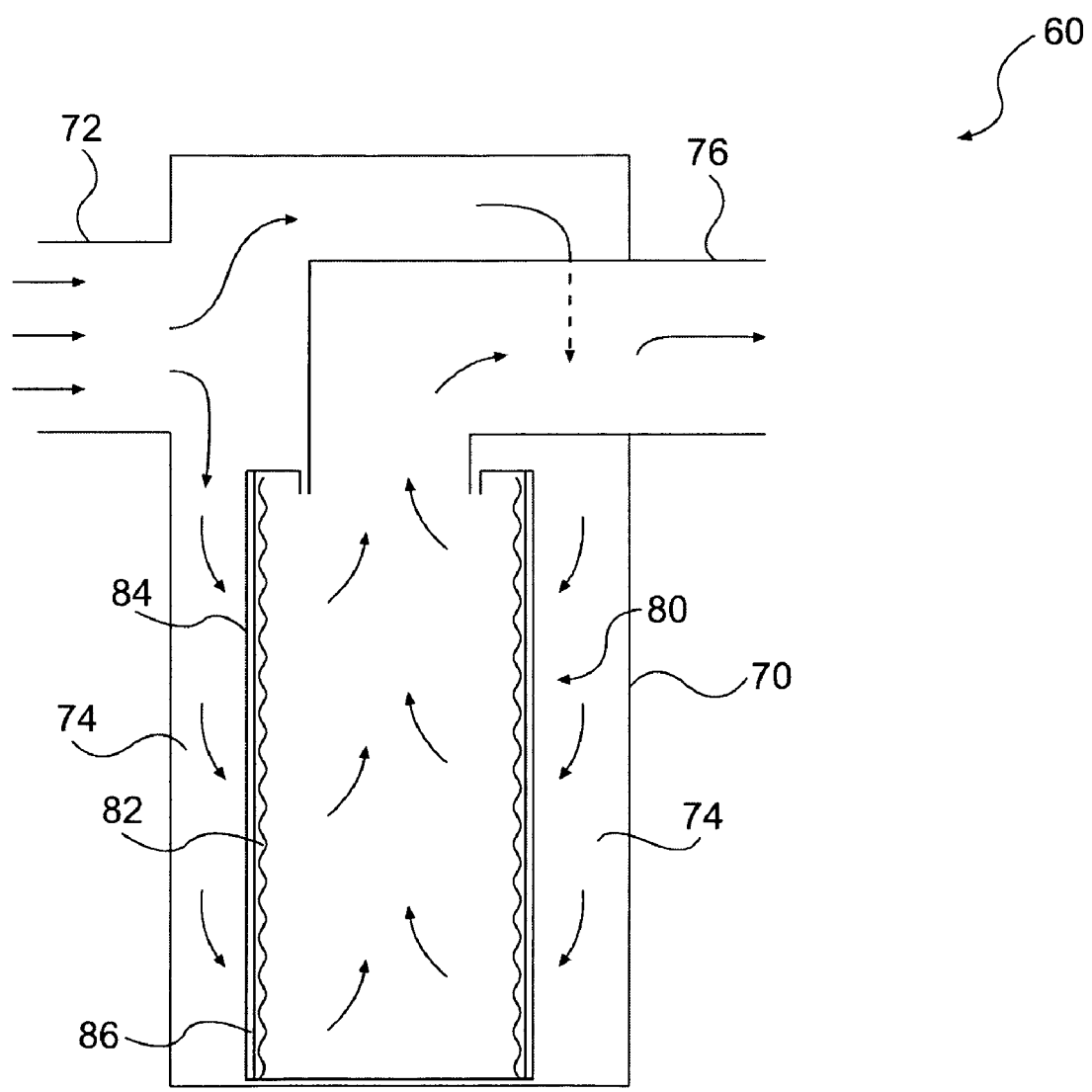
FIG. 2 is a diagrammatic illustration of an exemplary disclosed filter.

FIG. 2 illustrates a filter 60. Filter 60 may be disposed downstream of exhaust cooler 56, see FIG. 1. Filter 60 may include a housing 70 having an inlet 72 configured to receive exhaust from exhaust cooler 56, a main chamber 74, and an outlet 76 configured to direct exhaust to air induction system 30. Filter 60 may include a filter assembly 80. Filter assembly 80 may be disposed between inlet 72 and outlet 76 of housing 70. Filter assembly 80 may include a filter medium 82. Filter medium 82 may be constructed of glass microfibers, synthetic microfibers, a combination of synthetic and glass microfibers, or any other filter medium known in the art. Filter medium 82 may be chemically bound to better withstand acid that may be present in exhaust recirculation system 40. Filter medium 82 may be configured to trap debris, including debris due to corrosion, and particulate matter in exhaust recirculation system 40 and may secure filter assembly 80 to outlet 76. Filter medium 82 may be coated with a chemical composition that reacts with sulfuric acid to form a solid. Filter assembly 80 may also include a shell 84. Shell 84 may be a metal mesh or screen, may fix filter medium 82 in place, and may secure filter assembly 80 to outlet 76 within housing 70 All or a portion of shell 84 may be constructed of zinc, a zinc alloy, or other metal known in the art that corrodes, i.e. has a low resistance to corrosion when contacted by sulfuric acid. Alternatively, shell 84 may be constructed of a metal resistant to sulfuric acid or may be constructed of a metal with an acid resistant coating. Filter 60 may include a screen 86 that may be disposed upstream of filter medium 82. Screen 86 may be constructed of zinc, a zinc alloy, or other metal known in the art that corrodes, i.e. has a low resistance to corrosion when contacted by sulfuric acid. Filter 60 may be in communication with a control system 90.

Figure 3:
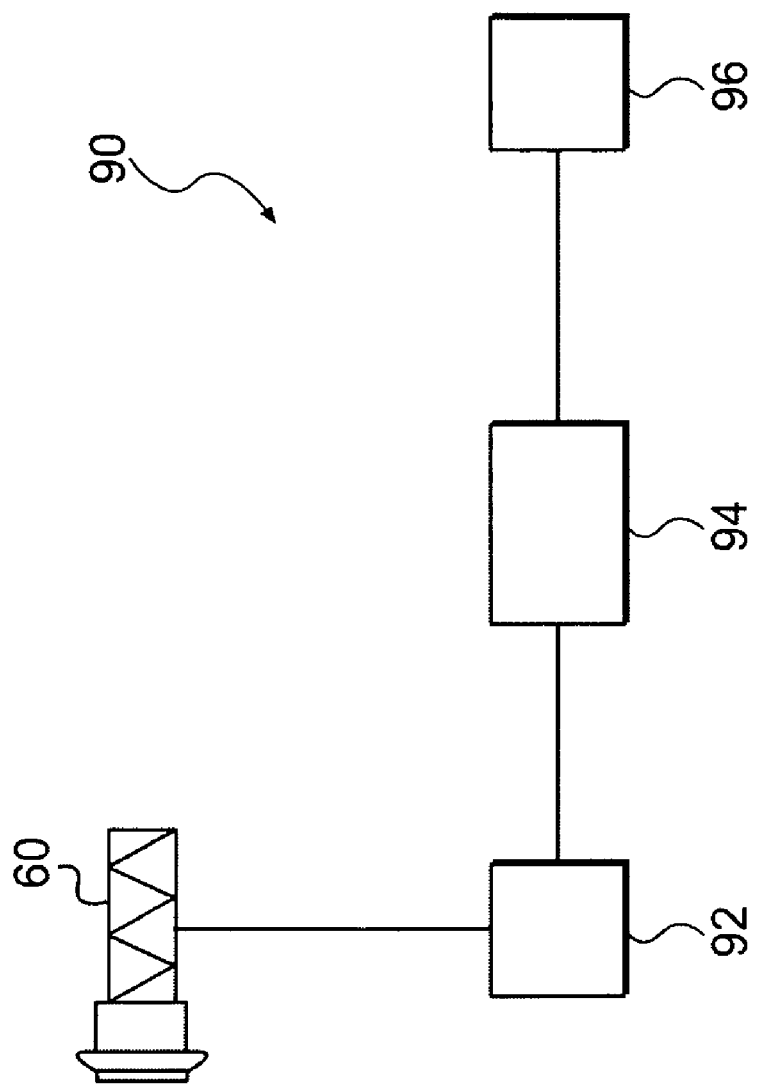
FIG. 3 is a diagrammatic illustration of a control system that may be used with the filter of FIG. 2.

As illustrated in FIG. 3, control system 90 may include components that interact to notify an operator of a condition of filter 60. In particular, control system 90 may include a differential pressure sensor 92, a controller 94, and an indication device 96. Controller 94 may receive input from differential pressure sensor 92, and in response, cause indication device 96 to provide an indication to the operator.

Differential pressure sensor 92 may be located in fluid communication with exhaust entering filter 60 and with exhaust existing filter 60 to determine a differential pressure between the two areas. For example, differential pressure sensor 92 may compare the pressure of exhaust within inlet 72 with the pressure of the exhaust within outlet 76 and generate a signal indicative of the differential pressure. An increase in differential pressure may be indicative of a flow restriction through filter 60. This differential pressure signal may be communicated to controller 94, and controller 94 may relate the differential pressure signal with a restriction value. Alternatively, it is contemplated that a first pressure sensor (not shown) may generate a signal indicative of the pressure of exhaust within inlet 72 and a second pressure sensor (not shown) may generate a signal indicative of the pressure of the exhaust within outlet 76. Controller 94 may receive the signals from the first and the second pressure sensors to determine the differential pressure between inlet 72 and outlet 76.

Controller 94 may include a single microprocessor or multiple microprocessors that include a manner for controlling an operation of indication device 96. Numerous commercially available microprocessors can be configured to perform the functions of controller 94. It should be appreciated that controller 94 could readily embody a general engine microprocessor capable of controlling numerous functions of power system 10. Controller 94 may include a memory, a secondary storage device, a processor, and other components for running an application. Various other circuits may be associated with controller 94 such as power supply circuitry, signal conditioning circuitry, solenoid driver circuitry, and other types of circuitry.

Indication device 96 may be operatively coupled to controller 94, and configured to provide one or more warning signals indicative of an increased differential pressure to a user of the machine. For instance, indication device 96 may include any component configured to provide a warning signal to a user associated with the machine such as, for example, a visual device or signal, e.g. a warning lamp, an LCD display, an LED lamp, or other visual device known in the art; an audible device, e.g. a speaker, a bell, a chime, or other audible device known in the art; a wireless device, e.g. a cell phone, a pager, or other wireless device known in the art; or any other output device known in the art. In addition to or alternatively indication device 96 may include a display component, for example, a computer, an operator panel, or an LCD for displaying the differential pressure or the warning signal.

INDUSTRIAL APPLICABILITY

The disclosed filter may be used with any power system where it is desired to monitor the content of sulfur in fuel. By providing an operator of a machine with an indication that excessive sulfur is present in the fuel, the operator may be able to refuel the machine or otherwise restore the power system to the proper operating conditions before damage occurs. The disclosed filter may also be used with any power system where it is desired to provide a back-up filter to catch debris from a failure in the system. A primary filter may fail and allow particulate matter to flow into the system or a component of the system, downstream of the primary filter, may fail and cause debris to flow into the system. The disclosed filter may act to trap debris and particulate matter that may enter into the system in this manner. The operation of power system 10 and, in particular, filter 60 is explained below.

Atmospheric air may be drawn into air induction system 30 via air filter 32 and directed through compressor 34 where it may be pressurized to a predetermined level before entering the combustion chamber of engine 12. Fuel may be mixed with the pressurized air before or after entering the combustion chamber of engine 12. The fuel and air mixture may be ignited by engine 12 to produce mechanical work and an exhaust flow containing gaseous compounds. The exhaust flow may be a fluid that may also contain solid particulate matter and sulfur. The exhaust flow may be directed from engine 12 to turbine 42 where the expansion of hot exhaust gases may cause turbine 42 to rotate, thereby rotating connected compressor 34 to compress the inlet air. After exiting turbine 42 the exhaust may flow through regeneration system 46 and flow through particulate filter 50.

A fuel-powered burner in regeneration system 46 may cause the sulfur to combine with oxygen to form sulfur dioxide gas ($SO_2$). Particulate filter 50 may have a base metal oxide catalyst that may oxidize the sulfur dioxide gas, i.e., add oxygen to form sulfur trioxide gas ($SO_3$). The exhaust flow may then be divided into two substantially particulate-free flows, including a first flow redirected to air induction system 30 and a second flow directed to the atmosphere via flow control valve 62 and exhaust outlet 52. The flow of the reduced-particulate exhaust may be directed through mass flow sensor 54 and then may be cooled by exhaust cooler 56 to a predetermined temperature. Exhaust cooler 56 may cause water in exhaust recirculation system 40 to condense. The sulfur trioxide may then dissolve in the condensed water and may form sulfuric acid ($H_2SO_4$).

The exhaust flow may pass through filter 60 and be directed back into air induction system 30 by compressor 34. The recirculated exhaust flow may be mixed with the air entering the combustion chambers. The exhaust flow, which is directed to the combustion chambers of engine 12, may reduce the concentration of oxygen therein, which may lower the maximum combustion temperature within engine 12. The lowered maximum combustion temperature may slow the chemical reaction of the combustion process, thereby decreasing the formation of nitrous oxides. In this manner, the gaseous pollution produced by engine 12 may be reduced without experiencing the harmful effects and poor performance caused by excessive particulate matter being directed into engine 12.

Sulfuric acid in the exhaust may be directed through filter 60 and may contact shell 84, may cause shell 84 to corrode, forming debris which may flow into filter medium 82. Filter medium 82 may trap the debris and the flow of exhaust through filter 60 may be restricted. Sulfuric acid in the exhaust gas may contact screen 86, may cause screen 86 to corrode, forming debris which may flow into filter medium 82. Filter medium 82 may trap the debris and the flow of exhaust through filter 60 may be restricted. Sulfuric acid in the exhaust gas may react with the chemical composition coating of filter medium 82 to form solids and subsequently be trapped, i.e. prevented from passing though filter medium 82 and through outlet 76. This trapping may restrict the flow of exhaust through filter 60. When flow through filter 60 becomes restricted, either by debris from shell 84, debris from screen 86, or solids formed from a reaction with the chemical coating, a differential pressure across filter 60, i.e. the difference in pressure between inlet 72 and outlet 76, may increase. As filter 60 becomes more restricted, the differential pressure increases to a greater degree. Differential pressure sensor 92 may generate a signal indicative of a differential pressure. Controller 94 may receive the signal from differential pressure sensor 92 and compare the signal with an expected differential pressure range. The amount the signal is outside of the expected range may relate to a restriction value. Controller 94 may cause indication device 96 to provide one or more warning signals, or other indication, including an indication of the restriction value, to the operator of the machine if the signal is outside of the expected range.

Several advantages of the disclosed filter may be realized. For example, the filter may be used with a power system, may monitor the content of sulfur in the fuel of the power system, and may provide an indication to the operator regarding the content of sulfur in the fuel by detecting sulfuric acid in the exhaust. The filter may also provide a large surface area for sulfuric acid in the system to contact and may cause a more rapid indication. The disclosed filter may also act as a back-up filter for the power system by traping debris and particulate matter that may not be filtered by a primary filter due to a failure of the primary filter or a failure of a component downstream of a primary filter. In this manner, the disclosed filter provide an indication of excessive particulate matter or debris in the system and may prevent damage to the engine.

It will be apparent to those skilled in the art that various modifications and variations can be made to the system of the present disclosure. Other embodiments of the power system will be apparent to those skilled in the art from consideration of the specification and practice of the method and apparatus disclosed herein. It is intended that the specification and examples be considered as exemplary only, with a true scope being indicated by the following claims and their equivalents.

What is claimed is:

1. A power system, comprising:
    an air induction system;
    a combustion chamber located downstream of the air induction system; and
    an exhaust recirculation system, including:
        a filter configured to receive a flow of exhaust from the combustion chamber, the filter including:
            a housing having an inlet and an outlet,
            a tubular filter medium disposed between the inlet and the outlet, the tubular filter medium defining an inner channel, the housing inlet being configured to direct the flow of exhaust to the tubular filter medium, the tubular filter medium being configured to allow the flow of exhaust to pass to the inner channel, the inner channel being configured to direct the flow of exhaust to the housing outlet, and
            a metal component disposed downstream of the inlet and upstream of the filter medium, the metal component at least partially surrounding the tubular filter medium, the metal component being configured to corrode with sulfuric acid present within the flow of exhaust to form debris, wherein the tubular filter medium is configured to trap the debris to increase a differential pressure between the inlet and the outlet.

2. The power system of claim 1, wherein the tubular filter medium is coated with a chemical composition configured to react with sulfuric acid in the flow of exhaust to form a solid.

3. The power system of claim 1, wherein the metal component includes a tubular screen or mesh surrounding the tubular filter medium.

4. The power system of claim 1, wherein the metal component includes an assembly configured to secure the tubular filter medium to the housing outlet, the assembly including a tubular shell surrounding the tubular filter medium.

5. The power system of claim 1, wherein the metal component includes:
    an assembly configured to secure the tubular filter medium to the housing outlet, the assembly including a tubular shell surrounding the tubular filter medium; and
    a tubular screen surrounding the tubular filter medium and disposed between the shell and the tubular filter medium.

6. The power system of claim 1, wherein the metal component includes a screen or mesh covering the filter medium.

7. The power system of claim 1, wherein the metal component includes an assembly configured to secure the filter medium to the housing outlet, the assembly including a shell covering the filter medium.

8. The power system of claim 1, further including:
    a pressure sensor in communication with the filter and configured to generate a first signal indicative of the differential pressure of the filter;
    an indication device; and
    a controller in communication with the pressure sensor and the indication device and configured to:
        receive the first signal indicative of the differential pressure of the filter, and
        affect an operation of the indication device in response to the first signal.

9. The power system of claim 8, wherein the indication device is configured to generate a second signal based on the first signal.

10. The power system of claim 9, wherein the second signal is one of an audible signal, a visual signal, or an audible and visual signal.

11. A method of detecting sulfuric acid in a power system, the method comprising:
    directing a flow of air into a combustion chamber;
    cooling a flow of exhaust from the combustion chamber;
    directing the cooled flow of exhaust toward the combustion chamber through a filter having an inlet, an outlet, a filter medium, and a component disposed downstream of the inlet and upstream of the filter medium;
    directing the cooled flow of the exhaust into contact with the component, thereby causing sulfuric acid present within the flow of the exhaust to corrode or react with the component to form solids or debris;
    restricting the cooled flow of the exhaust through the filter by trapping the solids or debris in the filter medium;
    measuring a restriction value indicative of an amount of the flow restriction; and
    providing an indication of a flow restriction based on the restriction value.

12. The method of claim 11, wherein:
    the component is a chemical composition configured to react with the sulfuric acid in the flow of the exhaust to form the solids or debris.

13. The method of claim 11, wherein the component is a metal and is configured to corrode in the presence of the sulfuric acid.

14. The method of claim 13, wherein the metal component includes a screen or mesh covering the filter medium.

15. The method of claim 13, wherein the metal component includes an assembly configured to secure the filter medium to the outlet, the assembly including a shell covering the filter medium.

16. The method of claim 11, further including:
    generating a first signal indicative of the restriction value; and
    affecting the operation of an indication device based on the first signal.

17. The method of claim 16, wherein affecting the operation of the indication device includes generating a second signal based on the first signal.

18. The method of claim 17, wherein the second signal is one of an audible signal, a visual signal, and an audible and visual signal.

19. A power system, comprising:
    a compressor to pressurize air;
    a first cooler located downstream of the compressor to cool the pressurized air;
    an engine located downstream of the first cooler and having a combustion chamber;
    an exhaust recirculation system, including:
        a turbine coupled to the compressor and being configured to rotate when acted upon by exhaust; and
        a filter, including:
            a housing having an inlet and an outlet,
            a filter medium disposed between the inlet and the outlet, and
            a component disposed downstream of the inlet and upstream of the filter medium, the component being configured to restrict a flow through the filter medium as a function of sulfuric acid present within the exhaust;

a differential pressure sensor in communication with the filter and configured to generate a first signal indicative of a differential pressure of the filter;

an indication device; and a controller in communication with the differential pressure sensor and the indication device and configured to:

receive the first signal indicative of the differential pressure of the filter, and affect the operation of the indication device based on the first signal.

20. The power system of claim 19, wherein the component is a chemical composition and is configured to react with sulfuric acid in the exhaust to form a solid.

21. The power system of claim 19, wherein the component is a metal and is configured to corrode in the presence of the sulfuric acid.

22. The power system of claim 21, wherein the metal component includes a screen or mesh covering the filter medium.

23. The power system of claim 21, wherein the metal component includes an assembly configured to secure the filter medium to the housing outlet, the assembly including a shell covering the filter medium.

* * * * *